US012700104B2

(12) United States Patent
Siak et al.

(10) Patent No.: US 12,700,104 B2
(45) Date of Patent: Aug. 4, 2026

(54) SYSTEM AND METHOD FOR TRACKING AND CLASSIFYING MOVING OBJECTS

(71) Applicant: Israel Aerospace Industries Ltd., Lod (IL)

(72) Inventors: Tal Siak, Tel Aviv (IL); Anna Gulitski, Holon (IL); Yaacov Tavger, Kiryat Arba (IL)

(73) Assignee: Israel Aerospace Industries Ltd., Lod (IL)

( * ) Notice: Subject to any disclaimer, the term of this patent is extended or adjusted under 35 U.S.C. 154(b) by 330 days.

(21) Appl. No.: 18/558,218

(22) PCT Filed: Apr. 5, 2022

(86) PCT No.: PCT/IL2022/050354
§ 371 (c)(1),
(2) Date: Oct. 31, 2023

(87) PCT Pub. No.: WO2022/243991
PCT Pub. Date: Nov. 24, 2022

(65) Prior Publication Data
US 2024/0221180 A1 Jul. 4, 2024

(30) Foreign Application Priority Data
May 3, 2021 (IL) ......................................... 282873

(51) Int. Cl.
*G06T 7/20* (2017.01)
*G01S 17/89* (2020.01)
(Continued)

(52) U.S. Cl.
CPC ................ *G06T 7/20* (2013.01); *G01S 17/89* (2013.01); *G06T 5/20* (2013.01); *G06V 10/25* (2022.01);
(Continued)

(58) Field of Classification Search
CPC ... G06T 7/20; G06T 5/20; G01S 17/89; G01S 7/4817; G01S 17/66; G06V 10/25;
(Continued)

(56) References Cited

U.S. PATENT DOCUMENTS

| | | | |
|---|---|---|---|
| 9,291,707 | B2 | 3/2016 | Nohara et al. |
| 2016/0179923 | A1 | 6/2016 | Chehreghani |

(Continued)

FOREIGN PATENT DOCUMENTS

| | | |
|---|---|---|
| CN | 110458938 A | 11/2019 |
| CN | 111337941 A | 6/2020 |

(Continued)

OTHER PUBLICATIONS

Aerial and surface security applications by P. Church et al., Pub. 2018 (Year: 2018).*

(Continued)

*Primary Examiner* — Gregory A Morse
*Assistant Examiner* — Ty Mitchell Beatty
(74) *Attorney, Agent, or Firm* — Ballard Spahr LLP

(57) ABSTRACT

A system and method for tracking moving objects located within an area of interest are described. A sequence of periodic frames of the area is generated from LiDAR measurements. The sequence includes preliminary periodic and periodic operational frames. Each periodic frame includes point cloud data including static object data and dynamic object data. The static data are filtered out by applying a pattern mask generated by using the predetermined number of the preliminary periodic frames. For each periodic operational frame, clusters of points related to the dynamic object data are generated. Tracks of the moving objects are each constructed from clusters related to the same object. The clusters are obtained for a predetermined number of the periodic operational frames. Each cluster is defined by a (Continued)

characteristics vector associated with a moving object in a corresponding periodic operational frame. Each characteristics vector includes cluster parameters associated with the corresponding moving object.

20 Claims, 3 Drawing Sheets

(51) Int. Cl.

| | | |
|---|---|---|
| *G06T 5/20* | (2006.01) | |
| *G06V 10/25* | (2022.01) | |
| *G06V 10/762* | (2022.01) | |
| *G06V 10/764* | (2022.01) | |

(52) U.S. Cl.
CPC .......... *G06V 10/762* (2022.01); *G06V 10/764* (2022.01); *G06V 2201/07* (2022.01)

(58) Field of Classification Search
CPC ............... G06V 10/762; G06V 10/764; G06V 2201/07; G06V 20/56
See application file for complete search history.

(56) References Cited

U.S. PATENT DOCUMENTS

| | | |
|---|---|---|
| 2017/0075356 A1 | 3/2017 | Delp |
| 2019/0102889 A1 | 4/2019 | Azanza et al. |
| 2020/0118277 A1 | 4/2020 | Mei et al. |
| 2021/0001891 A1 | 1/2021 | Majithia |
| 2021/0042557 A1 | 2/2021 | Roy |
| 2022/0138513 A1* | 5/2022 | Wienhold ................. G06T 7/97 |
| | | 382/159 |
| 2023/0139751 A1* | 5/2023 | Sanderovich ........... G01S 13/89 |
| | | 382/103 |

FOREIGN PATENT DOCUMENTS

| | | |
|---|---|---|
| CN | 114093165 A | 2/2022 |
| WO | 2021024727 A1 | 2/2021 |

OTHER PUBLICATIONS

Integration of Multi-frame Point-clouds by Y. Tatebe et al., Pub. (Year: 2017).*

Seeing Farther with LIDAR by A. Yellepeddi, Pub. 2020 (Year: 2020).*

Fod , et al., "Laser-Based People Tracking", IEEE International Conference on Robotics and Automation (ICRA) in Washington DC, May 2002, pp. 3024-3029.

Nowak , et al., "Real-Time Detection of Non-Stationary Objects Using Intensity Data in Automotive LiDAR SLAM", Sensors vol. 21, No. 6781. https://doi.org/10.3390/s21206781, Oct. 13, 2021, pp. 1-22.

Ma , et al., "Moving Object Detection and Tracking With Doppler LiDAR", Remote Sensing 2019, 11,1154; doi:3390/rs11101154. www.mdpi.com/journal/remotesensing, May 14, 2019, pp. 1-22.

Miller , et al., "Efficient Unbiased Tracking of Multiple Dynamic Obstacles Under Large Viewpoint Changes", IEEE Transactions on Robotics. vol. 27, No. 1, Feb. 2011, pp. 29-46.

\* cited by examiner

105

INITIATING TRACK FOR EACH
CLUSTER OF FIRST
OPERATIONAL FRAME

ASSIGNING EACH CLUSTER OF
CURRENT OPERATIONAL
FRAME TO CORRESPONDING
CLUSTER OF PREVIOUS
OPERATIONAL FRAME

STORING TRACKS OF
ASSIGNED CLUSTERS AND
UNASSIGNED CLUSTERS

SEQUENTIALLY UPDATING THE
STORED TRACKS

SYSTEM AND METHOD FOR TRACKING AND CLASSIFYING MOVING OBJECTS

TECHNOLOGICAL FIELD

The present invention is in the field of tracking systems, and more specifically relates to systems for tracking and classifying moving objects located within an area of interest.

BACKGROUND

Tracking systems, also known as locating systems, are used for constructing tracks of ground and/or aerial moving targets on a near-continuous basis, and determining their kinematic parameters, such as target spatial coordinates, bearing (azimuth) and elevation angles, range to the target, target velocity, etc. in a timely ordered sequence of measurements of target kinematic data. These kinematic data are processed and analyzed to construct one or more tracks of the targets(s) of interest, which can then be presented to an operator of the tracking system. Tracking systems can detect and track movements of people, animals, birds and other moving animate objects, as well as inanimate terrestrial and aerial objects within various areas of interest.

One commonly used tracking system is a radar tracking system that employs one or more radars and a radar tracker. The radars generate a sequence of radar detections (known as "plots") in polar coordinates representing the range and bearing of the targets of interest. These detections are then relayed to the radar tracker, which determines those sequences of detection which belong to the same target, whilst rejecting any plots which are believed to be false alarms. The radar tracker uses the sequence of plots to estimate/determine kinematic parameters of the target(s) and to construct tracks for the targets.

For example, U.S. Pat. No. 9,291,707 describes a 3D avian radar sampling system comprising a 3D volume scanning radar system and an avian track interpreter. Scanning methods employed ensure that volume revisit times are suitably short and track data produce 3D target trajectories. The avian interpreter uses the track data from the volume scanning radar to create detailed avian activity reports that convey bird abundance and behavior within a 3D cylindrical volume at hourly, daily, weekly, monthly and yearly intervals. Hourly activity reports (updated typically every 15 minutes) provide enhanced situational awareness of developing hazards and are actionable, allowing operators to dispatch wildlife control personnel to respond to threats.

Laser imaging, detection, and ranging (LiDAR) is known as a technique for determining ranges (variable distances) by targeting/detecting an object with a laser beam and measuring the time for the reflected light beam to return to a receiver. The reflected light beams can be processed into a 3D visualization known as a "point cloud". The LiDAR technique can be used to make digital 3-D representations of areas on the earth's surface and ocean floor, due to differences in laser return times, and by varying laser wavelengths. The LiDAR technique has terrestrial, airborne, and mobile applications.

GENERAL DESCRIPTION

Most conventional tracking systems use radio wave electromagnetic radiation in order to detect and track ground and/or aerial/celestial moving target(s) of interest. One drawback of conventional tracking systems is electromagnetic interference and existence of noise in the electromagnetic field, especially in urban environments. Another drawback of a radar tracking system is associated with health hazards that can be caused by radio wave electromagnetic radiation.

In view of the above, there is a need in the art for, and it would be useful to have, a tracking system that uses a LiDAR technique that uses laser light in order to construct tracks of the objects of interest.

It would also be useful and advantageous to have a tracking system that can detect various inanimate terrestrial and aerial objects, such as cars, drones, and other unmanned aerial vehicles.

It would also be useful and advantageous to have a tracking system that can detect and track movement of animate terrestrial and aerial objects, such as people, animals and birds in various terrains and aerial areas. Such areas can be open areas, urban areas, and areas with vegetation.

It would also be useful and advantageous to have a tracking system that can classify moving objects located within an area of interest.

The present invention partially eliminates the disadvantages of conventional tracking systems and provides a novel system for tracking moving objects located within an area of interest.

According to an embodiment of the present invention, the system includes a laser imaging, detection, and ranging (LiDAR) system configured for performing a plurality of scanning sessions of the area of interest sequentially in time, so as to generate a sequence of corresponding periodic frames of said area of interest.

According to an embodiment of the present invention, the plurality of scanning sessions can be performed by illuminating targets by the LiDAR system with a pulsed laser beam having a predetermined sampling rate (i.e., having a specified time between each pulse). Such a sampling rate of the sequence of corresponding periodic frames can, for example, be in the range of 5 Hz to 10 Hz. The sequence of corresponding periodic frames can include a predetermined number of preliminary periodic frames and a sequence of periodic operational frames.

According to an embodiment of the present invention, each periodic frame provided by the LiDAR system can include point cloud data. Point cloud data are indicative of external surfaces of static and moving objects located within the area of interest, which are illuminated by the LiDAR system. Point cloud data can include a static object data associated with the static objects and dynamic object data associated with the moving objects located within the area of interest.

According to an embodiment of the present invention, the system also includes a mask generating unit arranged downstream of the LiDAR system. The mask generating unit is configured for receiving and processing the predetermined number of the preliminary periodic frames from the LiDAR system, so as to generate a pattern mask. The pattern mask mainly includes the static object data associated with the static objects (background objects) located within the area of interest. However, the pattern mask can also include the dynamic object data associated with the dynamic objects, which occasionally appeared in the area of interest.

According to an embodiment of the present invention, the mask generating unit generates the pattern mask by combining the point cloud data of all preliminary periodic frames together.

According to an embodiment of the present invention, the system also includes a filtering unit coupled to the LiDAR system and arranged downstream of the mask generating unit. The filtering unit is configured for receiving and processing the pattern mask from the mask generating unit and the sequence of periodic operational frames from the LiDAR system. The filtering unit is also configured to apply the pattern mask to the point cloud data in order to filter out the static object data from the point cloud data, thereby providing the dynamic object data. The dynamic object data are indicative of the moving objects within the area of interest for the sequence of periodic operational frames.

According to an embodiment of the present invention, the system also includes a clustering unit arranged downstream of the filtering unit. The clustering unit is configured for receiving and processing the dynamic data obtained from the filtering unit, so as to generate clusters of points related to the dynamic data for each periodic operational frame. Each cluster is associated with a corresponding moving object located within the area of interest.

According to an embodiment of the present invention, the clustering unit generates the clusters of points related to the dynamic data for each periodic operational frame by associating points located in the area of interest within a predetermined distance from each other as an object. The predetermined distance can, for example, be in the range of 0.5 meters to 1.5 meters.

According to an embodiment of the present invention, the system also includes a track construction system arranged downstream of the clustering unit. The track construction system is configured for receiving and processing the clusters of points related to the dynamic data for each periodic operational frame, so as to provide tracks of the moving objects. Each track can be defined by a plurality of clusters related to the same object obtained for a predetermined number of periodic operational frames, correspondingly.

According to an embodiment of the present invention, each cluster can be defined by a corresponding characteristics vector associated with a corresponding moving object in a corresponding periodic operational frame. Each characteristics vector can include cluster parameters associated with the corresponding moving object. The cluster parameters can, for example, be selected from spatial coordinates of the cluster center mass, velocity of the cluster center mass, cluster dimension, and type of object motion.

According to an embodiment of the present invention, the track construction system includes a cluster assigning unit coupled to the clustering unit. The cluster assigning unit is configured for initiating tracks for clusters of a first operational frame. The cluster assigning unit is also configured for sequentially receiving clusters of points of operational frames from the clustering unit. Then, starting from a second operational frame, the cluster assigning unit sequentially assigns each cluster of a current operational frame to a corresponding cluster of the previous operational frame, so as to provide pairs of assigned clusters. Finally, the cluster assigning unit initiates tracks for unassigned clusters remaining after assignment.

According to an embodiment of the present invention, the cluster assigning unit is also configured for calculating distance differences ΔD between a position of the center mass of each cluster of the current operational frame and a predicted position of the center mass of each cluster of the previous operational frame. Then, the cluster assigning unit pairs each cluster of the current operational frame to the corresponding cluster of the previous operational frame to which the distance has a minimal magnitude.

It should be noted that such a minimal magnitude should not exceed a value of a product of a characteristic velocity of a moving object of interest and a time period between the previous operational frame and the current operational frame. Tracks for unassigned clusters, which remain after the assignment, are initiated.

According to an embodiment of the present invention, the distance difference ΔD between a cluster of the current operational frame and a cluster of the previous operational frame can be calculated by the cluster assigning unit as a difference between a position $$POS_{CM}^{cur}$$

of the center mass of the cluster of the current operational frame and a sum of a position $$POS_{CM}^{prev}$$

of the center mass of the cluster of the previous operational frame and a product of a velocity $$V_{CM}^{prev}$$

of the cluster center mass in the previous operational frame and a time period Δt between the previous operational frame and the current operational frame, to wit:

$$\Delta D = POS_{CM}^{cur} - (POS_{CM}^{prev} + V_{CM}^{prev} \Delta t).$$

According to an embodiment of the present invention, the track construction system also includes a track storing unit arranged downstream of the cluster assigning unit. The track storing unit is configured for receiving and storing tracks of the assigned clusters and the unassigned clusters.

According to an embodiment of the present invention, the track construction system also includes a track updating unit arranged downstream of the cluster assigning and coupled to the track storing unit. The track updating unit is configured for receiving the pairs of the assigned clusters from the cluster assigning unit, and sequentially updating the tracks corresponding to the assigned pairs in the track storing unit. The sequential updating of the tracks corresponding to the assigned pairs can be carried out by adding each assigned cluster of the current operational frame to the corresponding cluster of the previous operational frame.

According to another embodiment of the present invention, the track construction system can also include a maintenance system coupled to the storing unit. The maintenance system is configured for checking the stored tracks in the storing unit and for deleting obsolete tracks from the storing unit.

According to a further embodiment of the present invention, the system for tracking moving objects also includes a classification system coupled to the track construction system. The classification system is configured for identifying the moving objects by utilizing identification parameters obtained from corresponding clusters and tracks of the moving objects, and classifying the moving objects located within the area of interest. The classification system is configured for comparing the identification parameters of the moving objects obtained from the clusters and tracks with predetermined identification parameters typical for the moving objects.

According to another general aspect of the present invention, there is provided a method for tracking objects located within an area of interest utilizing the system for tracking moving objects, which is described hereinabove.

According to an embodiment of the present invention, the method includes performing a plurality of scanning sessions of the area of interest sequentially in time by using a laser imaging, detection, and ranging (LiDAR) system to generate a sequence of corresponding periodic frames of the area of interest.

According to an embodiment of the present invention, the method also includes generating a pattern mask including the static object data associated with static objects located within the area of interest by using said predetermined number of preliminary periodic frames.

According to an embodiment of the present invention, the method also includes filtering out the static data from said point cloud data. The filtering can be carried out by applying the pattern mask to the point cloud data to provide the dynamic object data. The dynamic object data is indicative of the moving objects within the area of interest for the sequence of periodic operational frames.

According to an embodiment of the present invention, the method also includes generating clusters of points related to the dynamic object data for each periodic operational frame. Each cluster is associated with a corresponding moving object located within the area of interest.

According to an embodiment of the present invention, the clusters of points related to the dynamic object data can be generated by associating the points located within a predetermined distance from each other as an object.

According to an embodiment of the present invention, the method also includes providing tracks of the moving object. Each track can be constructed from a plurality of clusters related to the same object. The plurality of clusters can be obtained for a predetermined number of the periodic operational frames.

According to an embodiment of the present invention, providing of the tracks of the moving objects begins with initiating tracks for clusters of a first operational frame. Then, starting from a second operational frame, sequentially assigning each cluster of a current operational frame to a corresponding cluster of a previous operational frame.

According to an embodiment of the present invention, the sequential assigning is carried out by calculating distance differences $\Delta D$ between a position of the center mass of each cluster of the current operational frame and a predicted position of the center mass of each cluster of the previous operational frame. Then, providing of the tracks includes pairing each cluster of the current operational frame to the corresponding cluster of the previous operational frame to which the distance has a minimal magnitude.

Further, tracks for unassigned clusters, which remain after the assignment, are initiated.

According to an embodiment of the present invention, providing of the tracks of the moving objects also includes storing tracks of the assigned clusters and the unassigned clusters.

According to an embodiment of the present invention, providing of the tracks of the moving objects also includes sequentially updating the stored tracks corresponding to the pairs of the assigned clusters by adding each assigned cluster of the current operational frame to the corresponding cluster of the previous operational frame.

According to an embodiment of the present invention, providing of the tracks of the moving objects also includes maintaining the stored tracks by checking the stored tracks and deleting obsolete tracks.

According to an embodiment of the present invention, the method for tracking moving objects can also include the steps of identifying the moving objects by utilizing identification parameters obtained from corresponding clusters and tracks of the moving objects, and classifying the moving objects located within the area of interest.

As described herein above, classification of the moving objects is performed by comparing the identification parameters of the moving objects obtained from the clusters and tracks with predetermined identification parameters typical for the moving objects.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
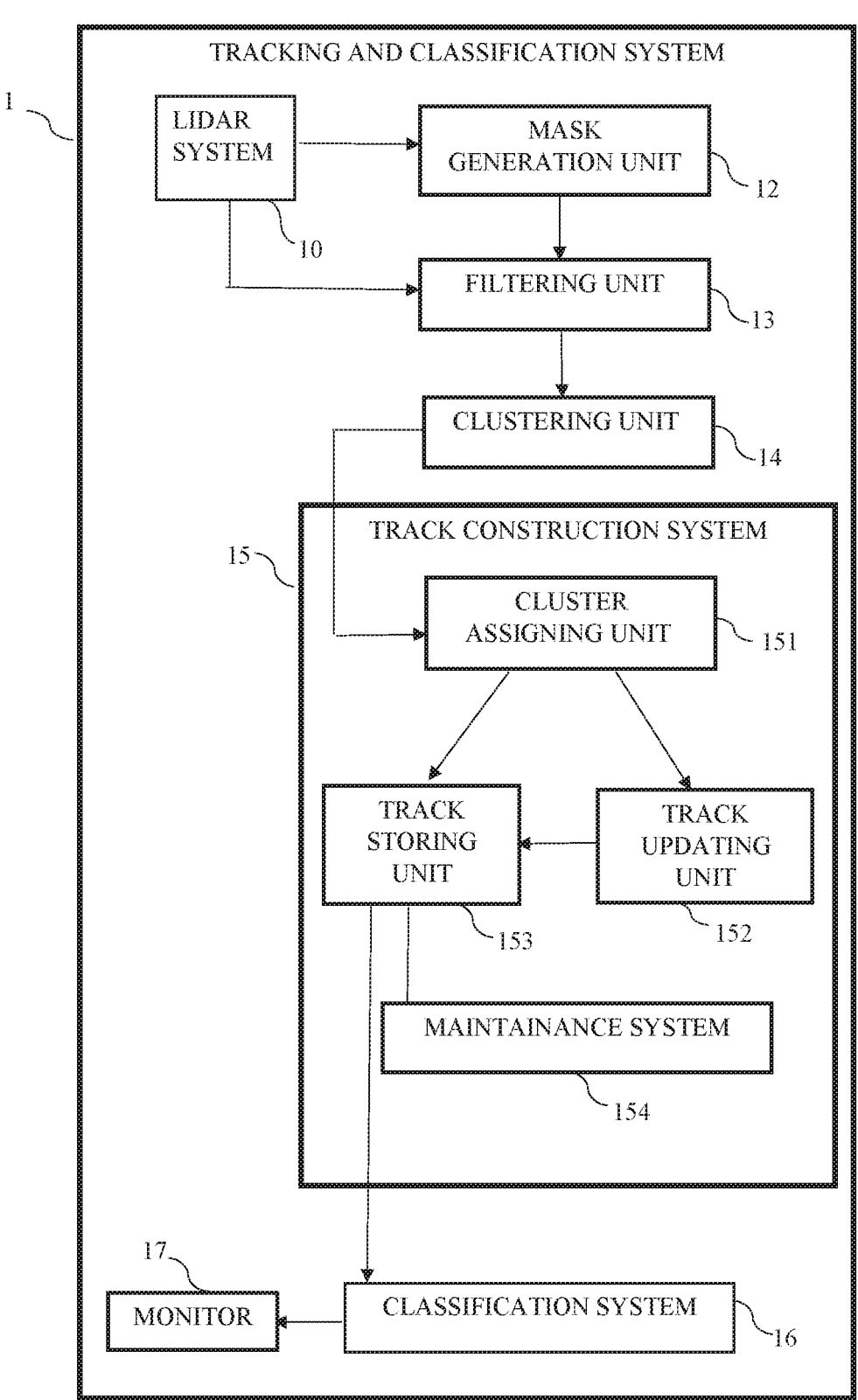
FIG. 1 illustrates a schematic block diagram of a system for tracking and classifying moving objects located within an area of interest.

The principles and operation of the system and method for tracking and classifying moving objects located within an area of interest according to the present invention may be better understood with reference to the drawings and the accompanying description, it being understood that these drawings and examples in the description are provided for illustrative purposes only and are not meant to be limiting. The same reference Roman numerals and alphabetic characters will be utilized for identifying those components which are common in the system of the present invention and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Unless specifically stated otherwise, throughout the description, utilizing terms such as "calculating" or "determining" or "obtaining" or "generating" or the like, refer to the action and processes of a computing system, or any electronic processing device, that manipulates and transforms data.

Referring to FIG. 1, a block diagram of a system 1 for tracking and classifying moving objects located within an area of interest is illustrated, according to an embodiment of the present invention.

According to an embodiment of the present invention, the system 1 includes a laser imaging, detection, and ranging (LiDAR) system 10 configured for performing a plurality of scanning sessions of an area of interest sequentially in time. In operation, the LiDAR system 10 can generate a sequence of corresponding periodic frames of the area of interest. In particular, in each scanning session, the LiDAR system 10 generates a corresponding periodic frame of the area of interest. The scanning sessions can be performed consecutively, such that once a certain scanning session is completed, another scanning session starts immediately, without any delay. Alternatively, the scanning sessions can be performed with a certain predetermined interval/delay between them.

It should be understood that the LiDAR system 10 is a device that can illuminate targets with a pulsed laser beam having a predetermined sampling rate (i.e., with a specified time between each pulse). For example, a sampling rate can be in the range of 5 Hz to 10 Hz.

According to an embodiment of the present invention, the LiDAR system 10 is a known device that includes an illuminating unit and a sensing unit (not shown). In operation, the illuminating unit generates laser beams and periodically scans the area of interest (not shown) via the laser beams.

According to an embodiment of the present invention, the illuminating unit generates laser beams of a predetermined wavelength range. Such a wavelength range can, for example, be in the range of 750 nanometers to 1.5 micrometers. In turn, the sensing unit collects reflected light arriving from external surfaces of static and moving objects located within the area of interest. Each light reflection from an object is represented by a point in a periodic frame obtained in a certain scanning session. The points are represented by spatial coordinates (e.g., Cartesian or polar coordinates) within the area of interest. Accordingly, each periodic frame can include a plurality of points related to various parts of one or more objects. This plurality of points forms a point cloud which is hereinbelow referred to as "point cloud data".

Each periodic frame includes point cloud data indicative of external surfaces of static and moving objects located within the area of interest. The point cloud data includes static object data associated with the static objects and dynamic object data associated with the moving objects.

According to an embodiment of the present invention, the sequence of corresponding periodic frames can include a predetermined number of preliminary periodic frames and a sequence of periodic operational frames that follow the preliminary periodic frames.

When desired, the LiDAR system 10 can also be configured to measure a distance from the LiDAR system 10 to a target object.

According to an embodiment, the system 1 also includes a mask generating unit 12 arranged downstream of the LiDAR system 10. The mask generating unit 12 is configured for receiving and processing the predetermined number of the preliminary periodic frames from the LiDAR system 10, so as to generate a pattern mask. The mask generating unit 12 generates the pattern mask by combining the point cloud data of all preliminary periodic frames together. Thus, the pattern mask can include the static object data associated with the static objects (background objects) located within the area of interest, and also dynamic data of some objects which can occasionally appear in the area of interest during the time interval of obtaining the preliminary periodic frames. This mask is used for filtering out (i.e. removing) points associated with static objects from operational frames which follow the preliminary periodic frames, as described hereinbelow.

According to an embodiment of the present invention, the system 1 also includes a filtering unit 13 coupled to the LiDAR system 10 and arranged downstream of the mask generating unit 12. The filtering unit 13 is configured for receiving the pattern mask from the mask generating unit 12 and for processing the sequence of the periodic operational frames from the LiDAR system 10. The filtering unit 13 is also configured for filtering out the static object data from the point cloud data from each operational frame.

According to an embodiment of the present invention, the filtering by the filtering unit 13 is carried out by applying the pattern mask to the point cloud data of the operational frames. As a result of the filtering process, the dynamic object data, which are indicative of the moving objects within the area of interest for each frame, are generated.

According to an embodiment of the present invention, the system 1 also includes a clustering unit 14 arranged downstream of the filtering unit 13, and configured for receiving and processing the dynamic data obtained from the filtering unit 13, so as to generate clusters of points. Thus, for each periodic operational frame, each cluster is associated with a corresponding moving object located within the area of interest. For each frame, the clusters of points are generated by associating the points, which are located at a predetermined distance from each other, as an object. For example, the points can be considered to be related to the same object when the predetermined distance between them is within the range of 0.5 meters to 1.5 meters.

As mentioned hereinabove, in each periodic operational frame, each point is defined by spatial coordinates within the area of interest. Accordingly, the distance between two points a and b can be determined by calculating a distance between the spatial coordinates of these points. Thus, for a given cluster of points, the distance d between any two arbitrary points a and b, which are related to this cluster, can be calculated by:

$$d = \sqrt{(x_a - x_b)^2 + (y_a - y_b)^2 + (z_a - z_b)^2}$$

where $(x_a, y_a, z_a)$ and $(x_b, y_b, z_b)$ are spatial coordinates of the points a and b, correspondingly.

The clustering unit 14 is also configured for calculating spatial coordinates of a cluster center mass for each cluster. The spatial coordinates of a cluster center mass in the area of interest hereinbelow are referred to as "cluster coordinates". The cluster coordinates can, for example, be calculated by

US 12,700,104 B2

9

$$x_{CM} = \frac{1}{N}\sum_{i=1}^{i=N} x_i;\ y_{CM} = \frac{1}{N}\sum_{i=1}^{i=N} y_i;\ z_{CM} = \frac{1}{N}\sum_{i=1}^{i=N} z_i$$

where N is the number of the points in the cluster.

According to an embodiment of the present invention, the system 1 also includes a track construction system 15 arranged downstream of the clustering unit 14, and configured for receiving and processing the clusters of points related to the dynamic data for each periodic operational frame, so as to provide tracks of the moving objects.

Each track is constructed from a plurality of clusters, related to the same moving object, obtained for a predetermined number of the sequence of periodic operational frames. For periodic operational frames, each cluster is defined by a characteristics vector associated with a corresponding moving object. Each characteristics vector includes cluster parameters associated with the corresponding moving object.

According to an embodiment of the present invention, the cluster parameters can be selected from spatial coordinates of the cluster center mass, a velocity of the cluster center mass, a cluster dimension, and a type of object motion that can be either a regular motion, or a chaotic motion.

According to an embodiment of the present invention, the track construction system 15 includes a cluster assigning unit 151 coupled to the clustering unit 14, a track storing unit 152 arranged downstream of the cluster assigning unit 151, and a track updating unit 153 arranged downstream of the cluster assigning 151 and coupled to the track storing unit 152.

In operation, the cluster assigning unit 151 sequentially receives cluster coordinates of the clusters of the operational frames from the clustering unit 14. Upon receipt of the cluster coordinates of a first operational frame from the clustering unit 14, the cluster assigning unit 151 initiates a track for each cluster of the first operational frame.

Starting from a second operational frame, the cluster assigning unit 151 is configured for sequentially assigning each cluster of a current (last received) operational frame to a corresponding cluster of a previous operational frame.

According to an embodiment of the present invention, the cluster assigning unit is configured for calculating distance differences ΔD between a position of the center mass of each cluster of the current operational frame and a predicted position of the center mass of each cluster of the previous operational frame. After the distance differences ΔD is calculated, the cluster assigning unit 151 pairs each cluster of the current operational frame to the corresponding cluster of the previous operational frame to which the distance has a minimal magnitude.

It should be noted that such a minimal magnitude should not exceed a value of a product of a characteristic velocity of a moving object of interest and a time period between the previous operational frame and the current operational frame. In other words, if a calculated distance difference ΔD between certain two clusters is greater than the product of a characteristic velocity (that the object of interest should not exceed) and the time period between two sequential frames, then such clusters are not paired.

New tracks for unassigned clusters, which remain after the assignment, are initiated.

According to an embodiment of the present invention, the distance difference ΔD between a cluster of the current operational frame and a cluster of the previous operational frame is calculated by the cluster assigning unit as a difference between a position $$POS_{CM}^{cur}$$

of the center mass of the cluster of the current operational frame and a sum of a position $$POS_{CM}^{prev}$$

of the center mass of the cluster of the previous operational frame and a product of a velocity $$V_{CM}^{prev}$$

of the cluster center mass in the previous operational frame and a time period Δt between the previous operational frame and the current operational frame, to wit:

$$\Delta D = POS_{CM}^{cur} - (POS_{CM}^{prev} + V_{CM}^{prev}\Delta t).$$

The time period Δt between the previous and current operational frames is calculated from the sampling rate of the frames.

As a result of the assigning process, the cluster assigning unit 151 provides pairs of assigned clusters. Each pair of the assigned clusters is associated with the same moving object. Alternatively, when the assignment process is not successful, i.e., when a certain cluster in the current operational frame is not assigned to any cluster of the previous operational frame, the cluster assigning unit 151 is configured for initiating tracks for such unassigned clusters.

According to an embodiment of the present invention, the track storing unit 153 is configured for receiving and storing tracks of the assigned clusters and the unassigned clusters. As mentioned above, each track is constructed from a plurality of clusters, related to the same moving object, obtained for a predetermined number of the sequence of periodic operational frames. For periodic operational frames, each cluster is defined by a characteristics vector associated with a corresponding moving object. Accordingly, the track storing unit 153 stores, for each moving object, corresponding characteristics vector(s) of the clusters, which define the track for this moving object. Each track in the track storing unit 153 can be updated periodically by adding an additional characteristics vector for each cluster in the corresponding operational frame, as described hereinbelow.

According to an embodiment of the present invention, the track updating unit 152 is configured for receiving the pairs of the assigned clusters from the cluster assigning unit 151, and sequentially updating the tracks corresponding to the assigned pairs in the track storing unit 153. The updating is carried out by adding each assigned cluster of the current operational frame to the corresponding cluster of the previous operational frame. More specifically, for a selected cluster of the current operational frame, updating of the corresponding track is carried out by adding a characteristics vector associated with this cluster to the set of the characteristics vectors from the previous frames, which define the track. As described above, each the characteristics vector includes the cluster parameters that can be selected from spatial coordinates of the cluster center mass, a velocity of the cluster center mass, a cluster dimension, and a type of object motion that can be either a regular motion or a chaotic motion.

When desired, the track storing unit 153 can be maintained by a maintenance system 154 that is configured to check for obsolete tracks and to delete the obsolete tracks from the storing unit 153. For example, obsolete tracks are the tracks which have not been updated for a predetermined amount of time and/or have not been updated for a predetermined number of operational frames. Maintenance can, for example, be carried out periodically by the maintenance system 154 once every few seconds and/or for a certain number of operational frames. The obsolete tracks can be detected, and then deleted when the elapsed time from the last update is more than a given time constant.

According to an embodiment of the present invention, when desired, the system 1 can also be configured for classifying moving objects located within an area of interest. According to this embodiment, the system 1 further includes a classification system 16 coupled to the track storing unit 153. The classification system 16 is configured for identifying one or more identification parameters of each moving object, and classifying each moving object located within the area of interest by their identification parameters. The classification is carried out by comparing identification parameters of the moving objects with typical identification parameters of the moving objects. The typical identification parameters can be predetermined and stored in a database (not shown) associated with the classification system 16.

In this connection, it should be noted that the system 1 of the present invention can be suitable to detect, track, and classify various types of moving objects, either terrestrial or ground moving objects. The various types of moving objects include, but are not limited to people, unmanned aerial vehicles (e.g., drones), animals, and birds. The classification of such moving objects can be carried by comparing various identification parameters such as kinematic identification parameters, geometrical identification parameters, and other identification parameters of the object.

According to an embodiment of the present invention, the kinematic identification parameters include, but are not limited to, velocity and regularity of motion (i.e., irregular chaotic or regular motion) of the moving objects. The kinematic identification parameters can be obtained from characteristic vectors of the moving objects.

Examples of the geometrical identification parameters include, but are not limited to, various dimensions and shapes of the moving objects. The geometrical identification parameters can be obtained from the dimensions of the clusters.

For example, when the system 1 is required to classify birds flying in the area of interest, the classification can be carried out by comparing geometrical identification parameters, such as bird body volume, bird wingspan, flock volume, etc., which can be obtained directly from the clusters, with typical geometrical parameters for various types of birds, which are stored in the database. Likewise, the classification can be carried out by comparing kinematic identification parameters calculated from the tracks with typical kinematic parameters of the various types of birds, which can also be stored in the database. Examples of the kinematic identification parameters of birds include, but are not limited to, velocity and regularity of motion of the birds.

The classified moving objects and the tracks of the moving objects can be presented to an operator of the system 1 on a monitor 17. The monitor 17 can, for example, be any device with a screen configured for displaying moving objects and the tracks of the moving objects.

Figure 2:
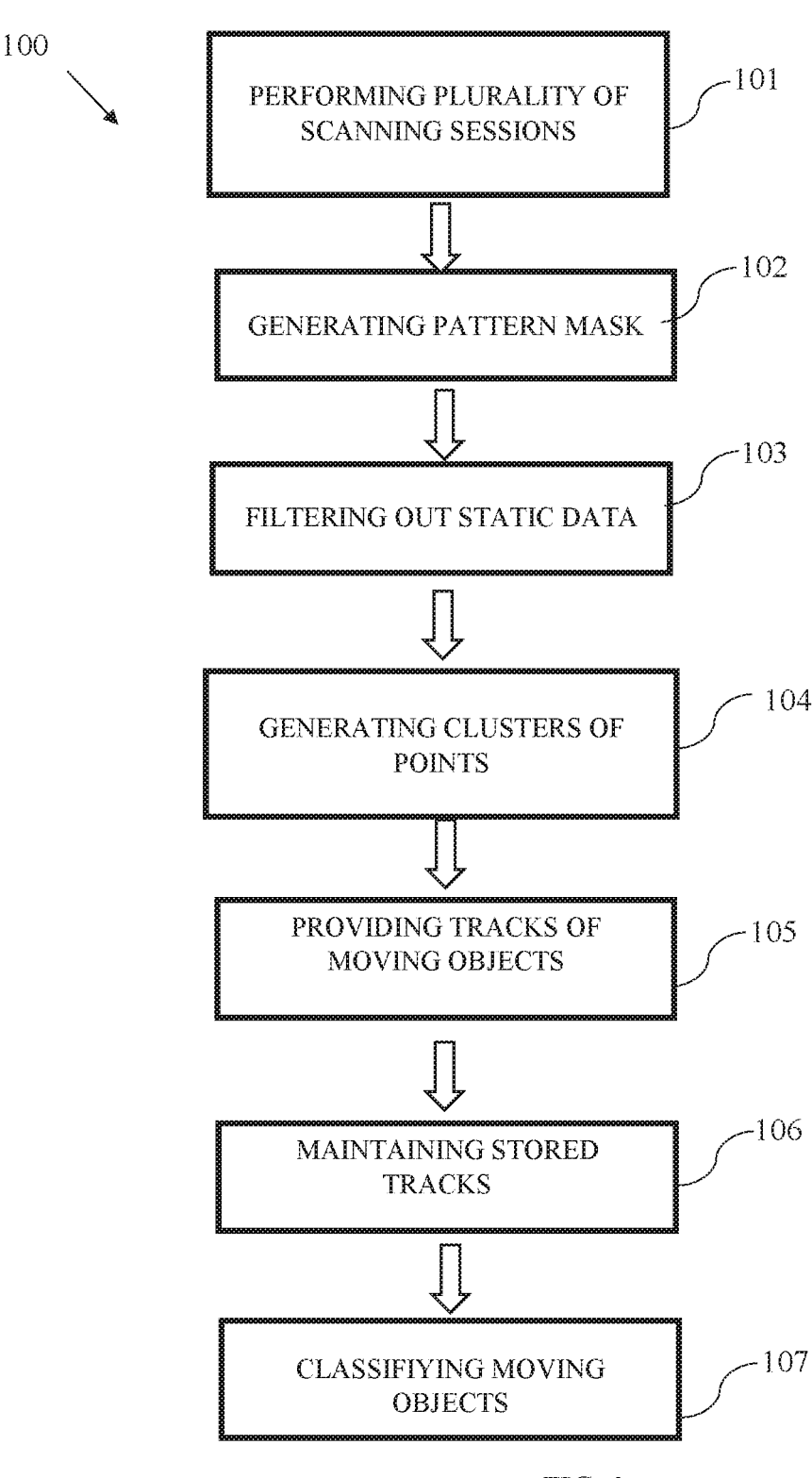
FIG. 2 illustrates a chart diagram of a method for tracking and classifying moving objects located within an area of interest.

Reference is made to FIG. 2, a chart diagram of a method 100 for tracking and classifying moving objects located within an area of interest is illustrated, according to an embodiment of the present invention.

The method 100 includes a step 101 of performing a plurality of scanning sessions of the area of interest sequentially in time by using a laser imaging, detection, and ranging (LiDAR) system to generate a sequence of corresponding periodic frames of the area of interest. Each scanning session generates a corresponding frame of the area of interest. The scanning sessions can be performed consecutively, such that once a certain scanning session is completed, another scanning session starts immediately, without any delay. Alternatively, the scanning sessions can be performed with a certain predetermined interval/delay between them.

The plurality of scanning sessions are performed by illuminating targets by the LiDAR system with a pulsed laser beam having a predetermined sampling rate (i.e., a specified time between each pulse). For example, a sampling rate can be in the range of 5 Hz to 10 Hz.

The area of interest is illuminated by laser beams of a predetermined wavelength range. Such a wavelength range can, for example, be in the range of 750 nanometers to 1.5 micrometers. In turn, the reflected light arriving from external surfaces of static and moving objects located within the area of interest is collected by the LiDAR system. Each light reflection from an object is represented by a point in a periodic frame obtained in a certain scanning session. Accordingly, each periodic frame can include a plurality of points related to various parts of one or more objects.

Each periodic frame includes point cloud data indicative of external surfaces of static and moving objects located within the area of interest. The point cloud data includes static object data associated with the static objects, and dynamic object data associated with the moving objects.

According to an embodiment of the present invention, the sequence of corresponding periodic frames can include a predetermined number of preliminary periodic frames and a sequence of periodic operational frames that follow the preliminary periodic frames.

When desired, the method can also include a step of measuring a distance from the LiDAR system to a target object located within the area of interest.

According to an embodiment of the present invention, the method also includes a step 102 of generating a pattern mask by using the predetermined number of the preliminary periodic frames. The pattern mask includes the static object data associated with static objects located within the area of interest. More specifically, the pattern mask is generated by combining the point cloud data of all preliminary periodic frames together. Thus, the pattern mask can include the static object data associated with the static objects (background objects) located within the area of interest and also dynamic data of some objects which can occasionally appear in the area of interest during the time interval of obtaining the preliminary periodic frames. This mask is used for filtering out (i.e. removing) points associated with static objects from operational frames which follow the preliminary periodic frames, as described hereinbelow.

According to an embodiment of the present invention, the method also includes a step 103 of filtering out the static data from the point cloud data from each operational frame. The filtering is carried out by applying the pattern mask to the point cloud data. As a result of the filtering process, the dynamic object data, which are indicative of the moving objects within the area of interest for each frame, are generated.

According to an embodiment of the present invention, the method also includes a step 104 of generating clusters of points related to the dynamic object data for each periodic operational frame. Thus, for each periodic operational frame, each cluster is associated with a corresponding moving object located within the area of interest. For each frame, the clusters of points are generated by associating the points in the frame, which are located at a predetermined distance from each other, as an object.

For example, the points can be considered related to the same object when the predetermined distance between them can, for example, be within the range of 0.5 meters to 1.5 meters.

According to an embodiment of the present invention, the method includes calculating spatial coordinates of a cluster center mass for each cluster in each operational frame.

According to an embodiment of the present invention, the method also includes a step 105 of providing tracks of the moving objects. Each track is constructed from a plurality of clusters related to the same object, which are obtained for a predetermined number of the sequence of periodic operational frames. For each periodic operational frame, each cluster is defined by a characteristics vector corresponding to the moving object. Each characteristics vector includes cluster parameters associated with the corresponding moving object.

According to an embodiment of the present invention, the cluster parameters can be selected from spatial coordinates of the cluster center mass, a velocity of the cluster center mass, a cluster dimension, and a type of object motion that can be either a regular motion, or an irregular chaotic motion.

Figure 3:
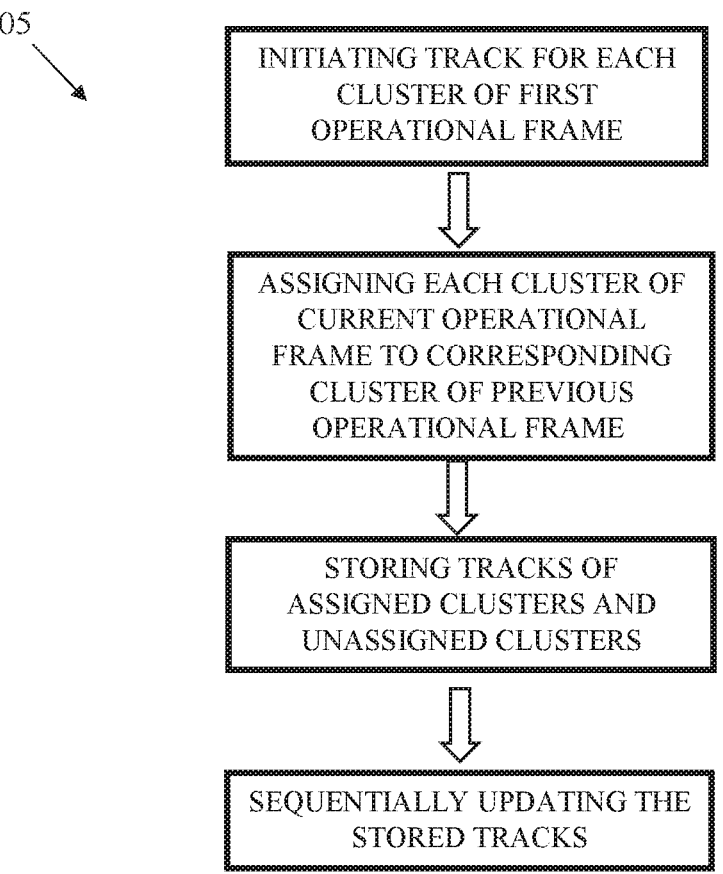
FIG. 3 illustrates a chart diagram of the method step of providing tracks of the moving objects of the method in FIG. 2, according to an embodiment of the present invention.

Referring to FIG. 3, a chart diagram of the method step 105 of providing tracks of the moving objects is illustrated, according to an embodiment of the present invention. Providing of the tracks of the moving objects includes initiating a track for each cluster of the first operational frame. Further, starting from a second operational frame, each cluster of a current (last received) operational frame is sequentially assigned to a corresponding cluster of a previous operational frame.

According to an embodiment of the present invention, the sequential assignment of the clusters of the previous and current operational frames is carried out by calculating distance differences $\Delta D$ between a position of the center mass of each cluster of the current operational frame and a predicted position of the center mass of each cluster of the previous operational frame. Then, providing of the tracks includes pairing each cluster of the current operational frame to the corresponding cluster of the previous operational frame to which the distance has a minimal magnitude.

According to an embodiment of the present invention, the distance difference $\Delta D$ between a cluster of the current operational frame and a cluster of the previous operational frame is calculated by the cluster assigning unit as a difference between a position $$POS_{CM}^{cur}$$

of the center mass of the cluster of the current operational frame and a sum of a position $$POS_{CM}^{prev}$$

of the center mass of the cluster of the previous operational frame and a product of a velocity $$V_{CM}^{prev}$$

of the cluster center mass in the previous operational frame and a time period $\Delta t$ between the previous operational frame and the current operational frame, to wit:

$$\Delta D = POS_{CM}^{cur} - (POS_{CM}^{prev} + V_{CM}^{prev}\Delta t).$$

The time period $\Delta t$ between the previous and current operational frames is calculated from the sampling rate of the frames.

As a result of the assigning process, pairs of assigned clusters are provided. Each pair of the assigned clusters is associated with the same moving object.

Alternatively, when the assignment process is not successful, i.e., when a certain cluster in the current operational frame is not assigned to any cluster of the previous operational frame, tracks for such unassigned clusters are initiated.

According to an embodiment of the present invention, providing tracks of the moving objects also includes storing tracks of the assigned clusters and the unassigned clusters, as described above.

According to an embodiment of the present invention, providing of the tracks of the moving objects also includes sequentially updating the stored tracks corresponding to the assigned pairs. The updating is carried out by adding each assigned cluster of the current operational frame to the corresponding cluster of the previous operational frame. More specifically, for a selected cluster of the current operational frame, updating of the corresponding track is carried out by adding a characteristics vector associated with this cluster to the set of the characteristics vectors from the previous frames, which define the track.

Turning back to FIG. 2, the method 100 for detecting and tracking moving objects also includes a step 106 of maintaining the stored tracks by checking for obsolete tracks and deleting the obsolete tracks. For example, obsolete tracks are the tracks which have not been updated for a predetermined amount of time and/or have not been updated for a predetermined number of operational frames. Maintenance can, for example, be carried out periodically once every few seconds and/or for a certain number of operational frames. The obsolete tracks can be detected, and then deleted when the elapsed time from the last update is more than a given time constant.

According to an embodiment of the present invention, when desired, the method also includes a step 107 of classification of the moving objects located within an area of interest. More specifically, the classification includes identifying one or more identification parameters of each moving object, and classifying each moving object located within the area of interest by their identification parameters. The classification is carried out by comparing identification parameters of the moving objects with typical identification parameters of the moving objects.

Examples of the kinematic identification parameters include, but are not limited to, velocity and regularity of motion (i.e., irregular chaotic or regular motion) of the moving objects. Examples of the geometrical identification parameters include, but are not limited to, various dimensions of the moving objects.

In this connection, it should be noted that the method 100 of the present invention can be suitable to detect, track, and classify various types of moving objects, either terrestrial or ground moving objects. The various types of moving objects include, but are not limited to people, unmanned aerial vehicles (e.g., drones), animals and birds. The classification of such moving objects can be carried by comparing various identification parameters such as kinematic identification parameters, geometrical identification parameters, and other identification parameters of the object.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

In the present application, an arrangement of one unit downstream of another unit implies electrical coupling of these units to each other with a possibility to transfer electrical signals between the elements in the direction of the current associated with the transferring of the electrical signals. In operation, the meaning of the arrangement in which a unit A is arranged downstream of a unit B means that the unit B receives output from the unit A. For completeness, it should be noted that use of the phrase "arranged downstream" in fact enhances the clarity of the claims in that it is very helpful for description of systems in which the unit B operates after the operation of the unit A.

Finally, it should be noted that the words "comprising", "including" and "having" as used throughout the appended claims are to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for tracking moving objects located within an area of interest, the system comprising:

a laser imaging, detection, and ranging (LiDAR) system configured for performing a plurality of scanning sessions of the area of interest sequentially in time, so as to generate a sequence of corresponding periodic frames of said area of interest; each periodic frame including a point cloud data being indicative of external surfaces of static and moving objects located within the area of interest, said point cloud data including a static object data associated with the static objects and dynamic object data associated with the moving objects, said sequence of corresponding periodic frames including a predetermined number of preliminary periodic frames and a sequence of periodic operational frames;

a mask generating unit arranged downstream of the LiDAR system, and configured for receiving and processing the predetermined number of the preliminary periodic frames from the LiDAR system, so as to generate a pattern mask including the static object data associated with the static objects located within the area of interest;

a filtering unit coupled to the LiDAR system and arranged downstream of the mask generating unit, and configured for receiving the pattern mask from the mask generating unit and for processing the sequence of the periodic operational frames from the LiDAR system by applying the pattern mask to said point cloud data to filter out the static object data from said point cloud data, so as to provide the dynamic object data being indicative of the moving objects within the area of interest for the sequence of periodic operational frames;

a clustering unit arranged downstream of the filtering unit, and configured for receiving and processing the dynamic data from the filtering unit, so as to generate clusters of points related to the dynamic data for each periodic operational frame, each cluster being associated with a corresponding moving object located within the area of interest;

a track construction system arranged downstream of the clustering unit, and configured for receiving and processing the clusters of points related to the dynamic data for each periodic operational frame, so as to provide tracks of the moving objects, each track being defined by a plurality of clusters related to the same object obtained for a predetermined number of the periodic operational frames correspondingly, each cluster being defined by a corresponding characteristics vector associated with a corresponding moving object in a corresponding periodic operational frame, each characteristics vector including cluster parameters associated with the corresponding moving object;

wherein the track construction system comprises:

a cluster assigning unit coupled to the clustering unit, and configured for:

initiating tracks for clusters of a first operational frame;

sequentially receiving clusters of points of operational frames from the clustering unit;

starting from a second operational frame, sequentially assigning each cluster of a current operational frame to a corresponding cluster of said previous operational frame, so as to provide pairs of assigned clusters; and initiating tracks for unassigned clusters remaining after assignment;

a track storing unit arranged downstream of the cluster assigning unit configured for receiving and storing tracks of the assigned clusters and the unassigned clusters; and a track updating unit arranged downstream of the cluster assigning and coupled to the track storing unit, the track updating unit configured for receiving the pairs of the assigned clusters from the cluster assigning unit, and sequentially updating, in the track storing unit, the tracks corresponding to the assigned pairs by adding each assigned cluster of the current operational frame to the corresponding cluster of the previous operational frame.

2. The system of claim 1, wherein said cluster parameters are selected from spatial coordinates of the cluster center mass, velocity of the cluster center mass, cluster dimension, and type of object motion.

3. The system of claim 1, wherein a sampling rate of said sequence of corresponding periodic frames of said area of interest is in the range of 5 Hz to 10 Hz.

4. The system of claim 1, wherein the mask generating unit generates the pattern mask by combining the point cloud data of all preliminary periodic frames together.

5. The system of claim 1, wherein the clustering unit generates the clusters of points related to the dynamic data for each periodic operational frame by associating points located within a predetermined distance from each other as an object.

6. The system of claim 1, wherein the cluster assigning unit is configured for:

calculating distance differences between a position of the center mass of each cluster of the current operational frame and a predicted position of the center mass of each cluster of the previous operational frame; and pairing each cluster of the current operational frame to the corresponding cluster of the previous operational frame to which the distance has a minimal magnitude.

7. The system of claim 6, wherein the distance difference between each cluster of the current operational frame and each cluster of the previous operational frame is calculated by the cluster assigning unit as a difference between a position of the center mass of the cluster of the current operational frame and a sum of a position of the center mass of the cluster of the previous operational frame and a product of a velocity of the cluster center mass in the previous operational frame and a time period between the previous operational frame and the current operational frame.

8. The system of claim 1, wherein the track updating unit is configured for updating a track for a selected cluster of the current operational frame in the track storing unit by adding a characteristics vector associated with said selected cluster to a set of the characteristics vectors from the previous frames.

9. The system of claim 1, wherein the track construction system comprises a maintenance system coupled to the storing unit and configured for checking the stored tracks in the storing unit, and for deleting obsolete tracks from the storing unit.

10. The system of claim 1, further comprising a classification system coupled to the track construction system, and configured for identifying the moving objects by utilizing identification parameters obtained from corresponding clusters and tracks of the moving objects, and classifying the moving objects located within the area of interest.

11. The system of claim 10, wherein the classification system is configured for comparing the identification parameters of the moving objects obtained from the clusters and tracks with predetermined identification parameters typical for the moving objects.

12. A method for tracking moving objects located within an area of interest, the method comprising:

performing a plurality of scanning sessions of the area of interest sequentially in time by using a laser imaging, detection, and ranging (LiDAR) system to generate a sequence of corresponding periodic frames of said area of interest, each periodic frame including point cloud data being indicative of external surfaces of static and moving objects located within the area of interest, said point cloud data including static object data associated with the static objects and dynamic object data associated with the moving objects, said sequence of corresponding periodic frames including a predetermined number of preliminary periodic frames and a sequence of periodic operational frames;

generating a pattern mask including the static object data associated with static objects located within the area of interest by using said predetermined number of the preliminary periodic frames;

filtering out the static data from said point cloud data by applying the pattern mask to said point cloud data to provide the dynamic object data being indicative of the moving objects within the area of interest for the sequence of periodic operational frames;

for each periodic operational frame, generating clusters of points related to the dynamic object data, each cluster being associated with a corresponding moving object located within the area of interest; and providing tracks of the moving objects, each track being constructed from a plurality of clusters related to the same object, said plurality of clusters being obtained for a predetermined number of the periodic operational frames, each cluster being defined by a corresponding characteristics vector associated with a corresponding moving object in a corresponding periodic operational frame, each characteristics vector including cluster parameters associated with the corresponding moving object, wherein the providing of the tracks of the moving objects comprises:

initiating tracks for clusters of a first operational frame;

starting from a second operational frame, sequentially assigning each cluster of a current operational frame to a corresponding cluster of a previous operational frame;

initiating tracks for unassigned clusters remaining after assignment;

storing tracks of the assigned clusters and the unassigned clusters; and sequentially updating the stored tracks corresponding to the pairs of the assigned clusters by adding each assigned cluster of the current operational frame to the corresponding cluster of the previous operational frame.

13. The method of claim 12, wherein said cluster parameters are selected from spatial coordinates of a cluster center mass, velocity of the cluster center mass, cluster dimension, and type of object motion.

14. The method of claim 12, wherein the generating of the pattern mask includes combining the point cloud data of all preliminary periodic frames together.

15. The method of claim 12, wherein the generating of clusters of points related to the dynamic object data includes associating the points located at a predetermined distance from each other as an object.

16. The method of claim 12, wherein the assigning of each cluster of the current operational frame to the corresponding cluster of the previous operational frame includes:

calculating distance differences between a position of the center mass of each cluster of the current operational frame and a predicted position of the center mass of each cluster of the previous operational frame; and pairing each cluster of the current operational frame to the corresponding cluster of the previous operational frame to which the distance has a minimal magnitude.

17. The method of claim 12, wherein the distance difference between each cluster of the current operational frame and each cluster of the previous operational frame is calculated by the cluster assigning unit as a difference between a position of the center mass of the cluster of the current operational frame and a sum of a position of the center mass of the cluster of the previous operational frame and a product of a velocity of the cluster center mass in the previous operational frame and a time period between the previous operational frame and the current operational frame.

18. The method of claim 12, wherein the providing of the tracks of the moving objects comprises maintaining the stored tracks by checking the stored tracks and deleting obsolete tracks.

19. The method of claim 12 further comprising:

identifying the moving objects by utilizing identification parameters obtained from corresponding clusters and tracks of the moving objects; and classifying the moving objects located within the area of interest.

20. The method of claim 19, wherein the classifying of the moving object includes comparing the identification parameters of the moving objects obtained from the clusters and tracks with predetermined identification parameters typical for the moving objects.

\*   \*   \*   \*   \*